United States Patent [19]
Coral et al.

[11] Patent Number: 5,432,963
[45] Date of Patent: Jul. 18, 1995

[54] TRUCK CAB MATTRESS

[75] Inventors: Robert C. Coral, Livonia, Mich.;
Edward L. Lehnert, Westerville,
Ohio

[73] Assignee: ASC Incorporated, Southgate, Mich.

[21] Appl. No.: 305,136

[22] Filed: Sep. 13, 1994

Related U.S. Application Data

[63] Continuation of Ser. No. 3,149, Jan. 12, 1993, abandoned.

[51] Int. Cl.$^6$ .......................... B60P 3/38; A47C 17/64
[52] U.S. Cl. ........................................... 5/118; 5/187
[58] Field of Search ................... 5/110, 112, 114, 187, 5/191; 299/284.2, 14

[56] References Cited

U.S. PATENT DOCUMENTS

| | | | |
|---|---|---|---|
| 77,856 | 5/1868 | Widmer | 5/187 |
| 229,421 | 6/1880 | Joslin | 5/187 |
| 273,925 | 3/1883 | Wilkie | 5/118 |
| 1,246,544 | 11/1917 | Chassaing | 5/187 |
| 1,262,663 | 4/1918 | Harter . | |
| 1,285,790 | 11/1918 | Purcell | 5/112 |
| 1,302,434 | 4/1919 | Richards . | |
| 1,321,703 | 11/1919 | Bennett . | |
| 1,404,145 | 1/1922 | Rietschel . | |
| 1,493,673 | 5/1924 | Honnell . | |
| 1,516,434 | 11/1924 | Hoogner | 5/187 |
| 1,544,277 | 6/1925 | Smith . | |
| 1,544,505 | 6/1925 | Tope . | |
| 1,566,222 | 12/1925 | Line | 5/118 |
| 1,724,162 | 8/1929 | Young | 5/187 |
| 1,799,029 | 3/1931 | Smith | 5/187 |
| 1,851,499 | 3/1932 | Edwards | 5/187 |
| 2,011,874 | 8/1935 | Ricketts | 5/187 |
| 2,464,863 | 3/1949 | Hoard | 5/187 |
| 3,040,340 | 6/1962 | Davis . | |
| 3,044,080 | 7/1962 | Hartwig | 5/112 |
| 3,054,121 | 9/1962 | Bridges, Jr. . | |
| 3,524,673 | 8/1970 | Cramer et al. . | |
| 3,742,529 | 7/1973 | Stehlik | 5/118 |
| 3,882,557 | 5/1975 | Stehlik . | |
| 4,176,414 | 12/1979 | Wright et al. | 5/187 |
| 4,659,137 | 4/1987 | Chassaing et al. . | |
| 4,664,438 | 5/1987 | Crepaldi . | |
| 4,776,636 | 10/1988 | Pyle et al. | 5/472 |
| 4,807,314 | 2/1989 | Fry et al. . | |
| 5,170,521 | 12/1992 | Light | 5/118 |

FOREIGN PATENT DOCUMENTS 871636 2/1960 United Kingdom .

*Primary Examiner*—Michael J. Milano
*Attorney, Agent, or Firm*—Harness, Dickey & Pierce

[57] ABSTRACT

Provided is a folding bed arrangement for over-the-road-trucks. The folding bed includes first and second frame members and an elastic mattress stretched over the frame members. The first frame member is secured within the truck cab and the second frame member is pivotably mounted to the first frame member and is adapted to be moved from an upright stowed position to a lowered sleeping position. In the lowered sleeping position, the elastic mattress is stretched so as to provide a firm comfortable sleeping surface.

20 Claims, 4 Drawing Sheets

TRUCK CAB MATTRESS

This is a continuation of U.S. patent application Ser. No. 08/003,149, filed Jan. 12, 1993 now abandoned.

BACKGROUND AND SUMMARY OF THE INVENTION

This invention relates generally to bed arrangements for over-the-road trucks, and more particularly, to a folding bed arrangement adaptable to the cab of an over-the-road truck having a supportive fabric mattress.

Large over-the-road trucks, or long haul tractor-trailers have long been designed with extended cab areas into which beds may be placed so that the drivers have a place to sleep or relax during breaks in driving. Often the cab is designed to accommodate two such beds, however, since the cab of the truck is also frequently the driver's home for long periods of time, it is important to create as much storage space within the cab for keeping the drivers belongings or other items. Therefore, it is desirable to have a bed arrangement which can be compactly and conveniently stored within the cab, thus providing extended storage space, yet still providing a convenient comfortable sleeping surface.

In this regard, folding beds and beds adapted for use within truck cabs are well known in the art. For example, U.S. Pat. No. 4,664,438 discloses a bed which includes a rigid honeycombed sleeping surface which may be folded up and out of the way for additional storage. U.S. Pat. No. 4,659,137 discloses a folding bunk which has a canvas sleeping area supported on two rods. One of the rods may be moved to a first position where the canvas material is extended into a horizontal sleeping surface or to a second position, where the rod and canvas material are folded out of the way. As will be greatly appreciated, however, the bunk must not only be convenient to use and stow, it must also be comfortable to sleep on, that is, not too hard so as to be uncomfortable nor too flimsy so as not to provide enough support. Prior art bunks having rigid sleeping surfaces are either very hard and uncomfortable to sleep on or require large cushions or mattresses which take up storage space and add to the weight and cost of the bunk. Bunks using canvas material generally do not provide the support required for comfortable sleeping.

Accordingly, the present invention is directed to a folding bed arrangement for over-the-road trucks in which the bed is constructed of a frame and a semi-elastic fabric stretch over the frame providing a firm comfortable sleeping surface. The frame can be pivoted from a lowered or sleeping position to a raised or stowed position thereby allowing ease of access to and increased storage area. The semi-elastic fabric, when the bunk is in the lowered position, is stretched to a pre-load tension condition thereby providing the firmness necessary for a superior sleeping surface without a conventional mattress. The pivoting frame is designed to provide the predetermined amount of pre-load to the fabric when it is in the sleeping position as well as to facilitate the stowing or extending of the bunk.

Another object of the present invention is to provide a comfortable supportive folding bunk arrangement for over-the-road trucks which can be conveniently stowed within a minimum amount of space in the cab and is quickly and easily moved from the stowed position to a sleeping position and vise versa.

An additional object of the present invention is to provide a folding bed arrangement for over-the-road trucks in which the tensioned fabric mattress further acts to retain the folding bed in the stowed position thereby eliminating the need for additional latches, straps or gas cylinders to retain the bed in the stowed position.

Still another object of the present invention is to provide a comfortable supportive folding bunk arrangement for trucks which is light weight and low cost.

These and other advantages and features of the present invention will become apparent to those skilled in the art from the following written description and appended claims taken in conjunction with the accompanying drawings.

DETAILED DESCRIPTION OF THE PREFERRED EMBODIMENT

The present invention provides a folding bunk arrangement adaptable to the interior of number of types of vehicles such as over-the-road trucks, recreational vehicles, marine craft and aircraft. While shown embodied in a folding bunk 10 adapted to a cab 22 of an over-the-road truck one will appreciated that the present invention is not so limited in application. The folding bunk arrangement generally includes a fabric mattress 12 which is stretched over a frame 14 that can be lowered into a sleeping position or folded into an upright stowed position.

Figure 1:
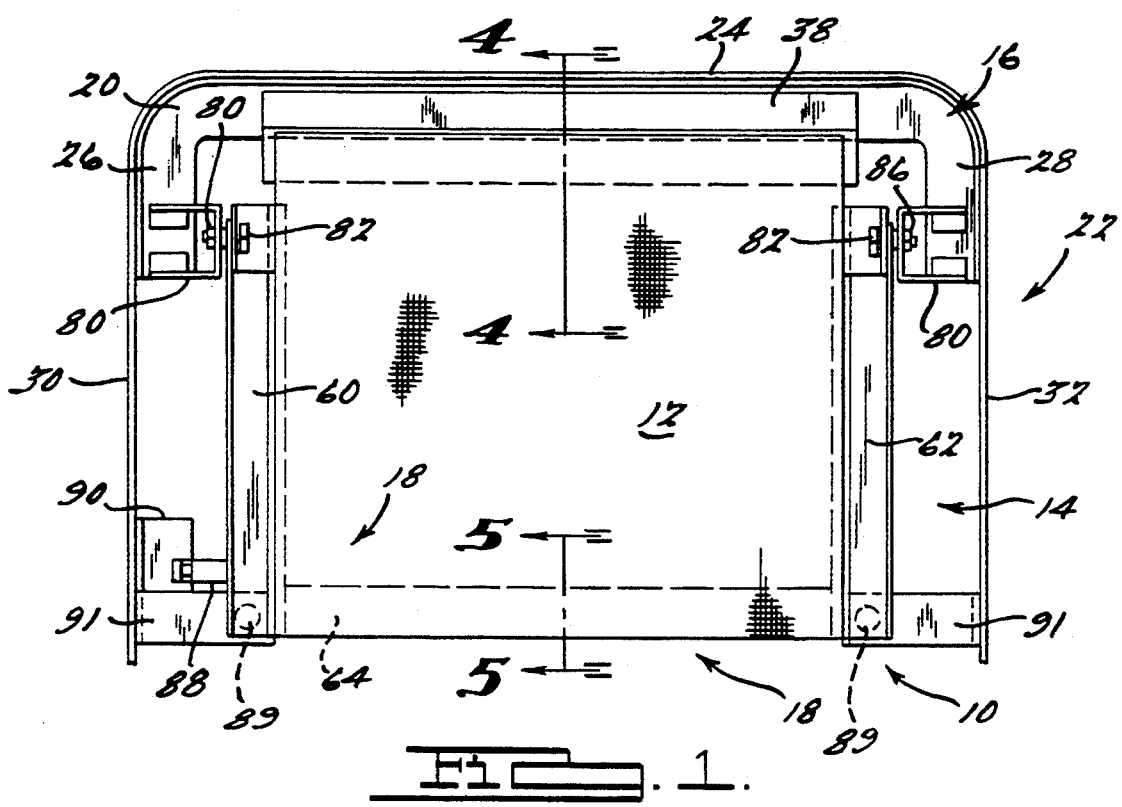
FIG. 1 is a top view of the folding bed of the present invention, in a lowered or sleeping position.
Figure 4:
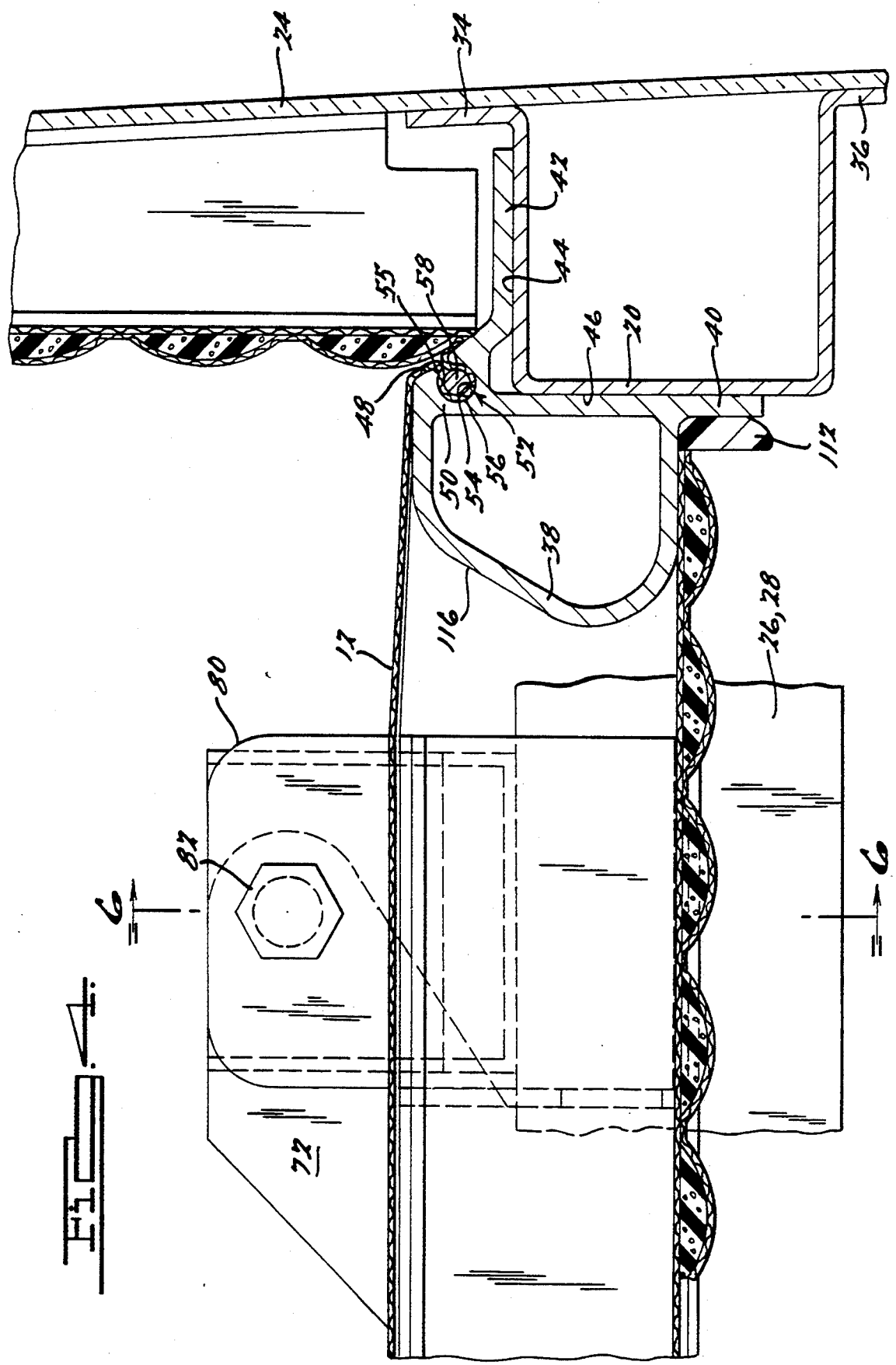
FIG. 4 is a sectional view taken along line 4—4 of FIG. 1 showing the attachment of the fabric mattress to the rear of the cab.

Referring to FIG. 1, the frame 14 includes rear frame section 16 and forward folding frame section 18. Rear frame section 16 includes an elongated reinforcement 20 rigidly secured to the rear wall 24 of the cab 22. The elongated reinforcement 20 extends for generally the entire width of the cab and has at each end forward extending formations 26 and 28, respectively, substantially following the transition of the cab rear wall to the cab right and left side walls 30 and 32. As best seen in FIG. 4, elongated reinforcement 20 is generally a channel or "hat" shaped section with a pair of flanges 34 and 36 extending substantially vertically upwardly and downwardly, respectively, for securing the reinforcement 20 to the rear wall 24 of the cab 22 by, for example, bonding and riveting.

With continued reference to FIG. 4, secured to the elongated bracket 20 is retainer member 38 for retaining fabric mattress 12 in place near the rear wall 24 of the cab 22. Retainer member 38 has a generally box shaped section with horizontally and vertically extending flanges 40 and 42, respectively, adapted to secure, by fastener or bonding, retainer member 38 to elongated reinforcement 20 along the upper and forward surfaces 44 and 46, respectively, of reinforcement 20. Near the upper rear surface 48 of the retainer member 38 is a formation 50 having an elongated channel 52 formed therein and extending for the entire length of retainer member 38. The channel 52 has a arcuate cylindrical surface 54 connected to the upper surface 48 of the formation 50 along its length by a slot 55 formed in surface 48. The cylindrical surface 54 is sized so as to receive a loop 56 sewn into fabric mattress 12 and a retaining dowel 58 inserted through loop 56 and circular section 54. The diameter of circular surface 54, loop 56 and dowel 58 being larger than the width of slot 56. As will be appreciated, fabric mattress 14 extends out through slot 56 and is retained in the channel by engagement of loop 56 and dowel 58 with the cylindrical surface 54.

With reference once again to FIG. 1, forward folding frame 18 is a generally "C" shaped member which includes side frame members 60 and 62, respectively, and forward frame member 64. Side members 60 and 62 are box shaped sections having outer, upper and inner members 66, 68 and 70 respectively as can be best seen in FIG. 6. Outer and upper members 66 and 68 include mounting flanges 72 and 74, respectively. Mounting flanges 72 and 74 extend upwardly from side members 60 and 62 and have formed therein apertures 76 and 78, respectively. Folding frame member 14 is pivotably attached to upwardly extending hinge brackets 80, secured to forward extending formations 26 and 28, by shoulder bolts 82 extending through apertures 76 and 78 and aperture 84 formed in hinge brackets 80. Shoulder bolts 82 are suitably secured to hinge brackets 80 by nuts 86. As will be appreciated from this design, when folding frame 18 is lowered to a horizontal position, folding frame will be in an "over-center" relation to the pivot axis defined by the centerline axis "Y" of shoulder bolts 80. As will be described, pre-load tension in fabric mattress 12 and the over-center condition of folding frame 18 with respect to the pivot axis act to maintain folding member 18 in the lowered position. To further maintain folding frame in the lowered position and prevent further rotation of folding frame 18 beyond horizontal, striker 88 is secured to side member 60 and engages latch 90 secured to side wall 30 of cab 22. Further shown are rubber down stop bumpers 89 secured to formations 91, attached to the cab side walls 30 and 32, which also support folding frame member 18 in the lowered position.

Figure 5:
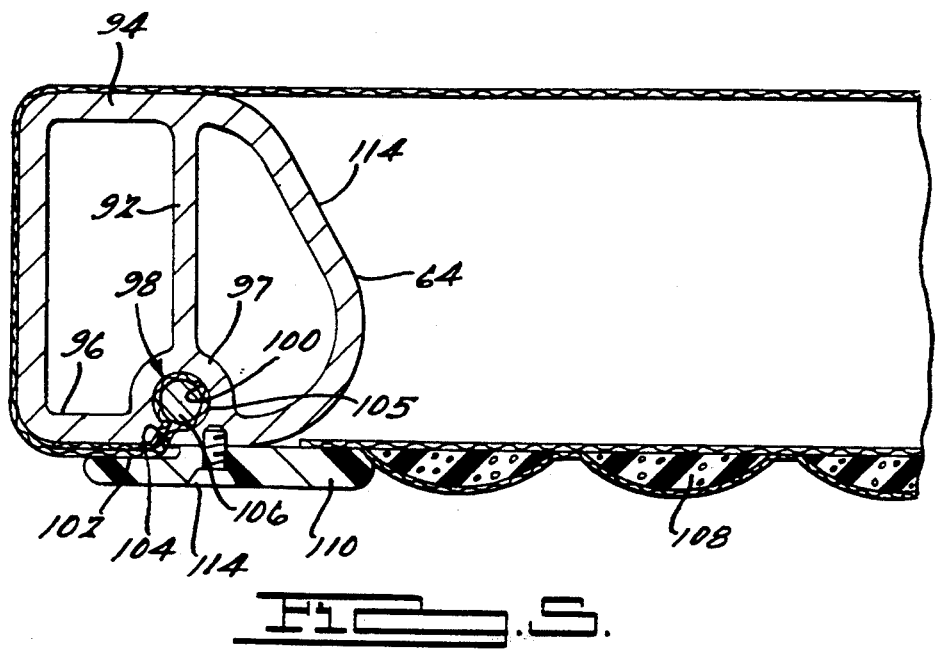
FIG. 5 is a sectional view taken along line 5—5 of FIG. 1 showing the attachment of the fabric mattress to the front of the folding frame.

Forward frame member 64 is secured between side members 60 and 62 by fasteners or bonding. As is best seen in FIG. 5, forward frame member 64 also acts as the forward retainer for fabric mattress 12. Forward frame member 64 has a generally box shaped section with a reinforcing rib 92 extending between its upper surface 94 and its lower surface 96. Reinforcing rib 92 intersects lower surface 96 at a formation 97 which is similar to formation 50 formed along the upper surface of retainer member 38. That is, there is an elongated channel 98, having an arcuate cylindrical surface 100 along the length of forward frame member 64. Cylindrical surface 100 is connected to the outer surface 102 of forward frame member 64 by slot 104 also formed in forward frame member 64. In a manner similar to that by which the fabric mattress 12 is retained to retainer member 38, a loop of fabric 105 sewn into mattress 12 is inserted into channel 98 and is retained against cylindrical surface 100 by dowel 106.

Figure 6:
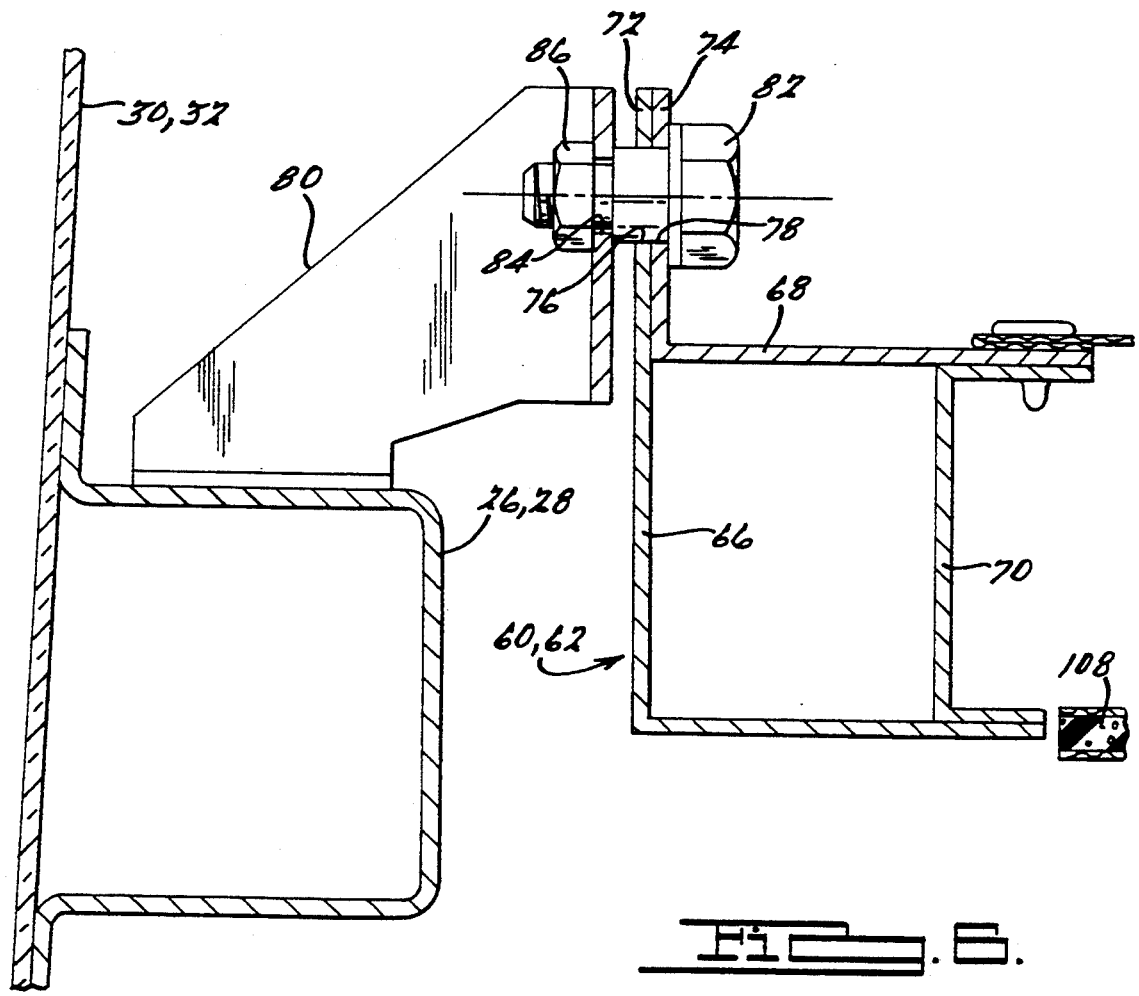
FIG. 6 is a sectional view taken along line 6—6 of FIG. 4 showing the pivot arrangement for the folding frame.

On the bottom side of folding frame 18, when in the lowered sleeping position as shown in FIGS. 4 and 5, there is trim piece 108 secured to forward frame member 64 and retainer member 38 by trim retainers 110 and 112 and a plurality of fasteners one of which is shown at 114. Trim piece 108 provides an aesthetically pleasing surface when folding bunk 10 is placed in its upright or stowed position. In order to prevent fabric 12 from binding against forward frame member 64 and retainer member 38, rearward and forward upper surfaces 114 and 116, respectively, of forward frame member 64 and retainer member 38 are rounded. Also as shown in FIG. 6, fabric mattress 12 may be secured to side frame members 60 and 62 by push in fasteners one of which is shown at 113.

Figure 7:
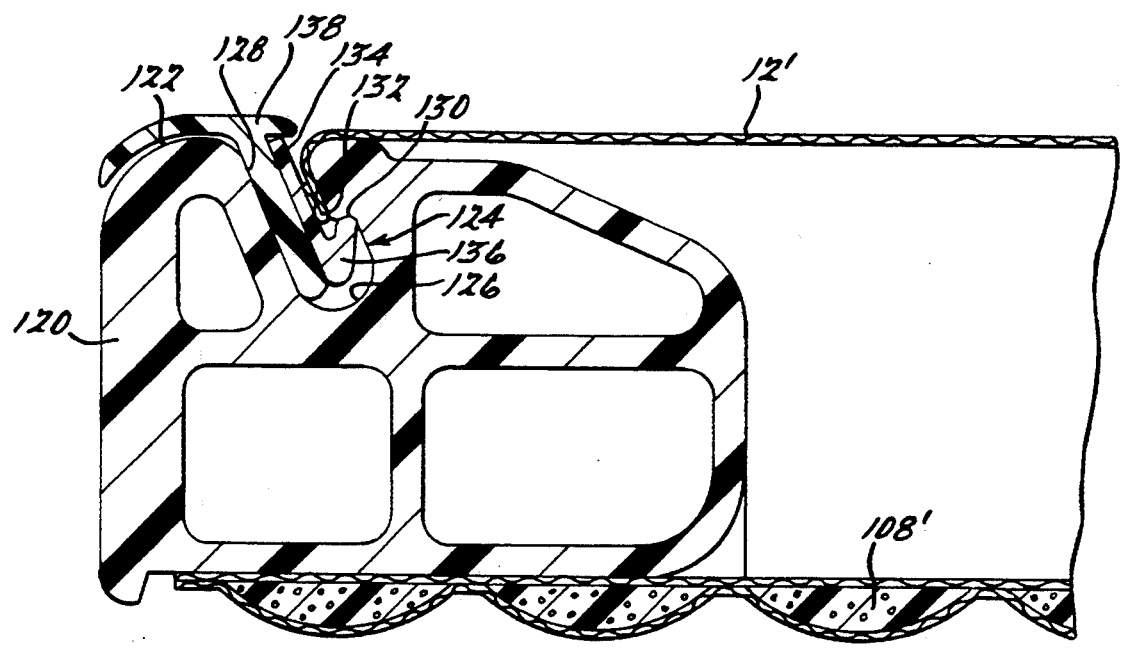
FIG. 7 is a sectional view similar to FIG. 5 showing an additional embodiment of the attachment of the fabric mattress to the folding frame.

With reference to FIG. 7, an additional embodiment of the forward frame member is shown illustrating an alternate means of attaching fabric mattress 12' to the folding frame. Primed reference numerals are used to distinguish elements which are the same as in the first embodiment. In FIG. 7, forward frame member 120 has formed at its upper surface 122 an elongated channel 124. Elongated channel has a generally "D" shaped bottom section 126 which is connected to the outer surface 122 by slot 128. Where slot 128 intersects "D" shaped section 126, there is a step 130. A fold of fabric 132 is inserted into slot 128 and is pressed against one surface of slot 128 by retainer-lock 134. Retainer-lock 134 has a hook shaped portion 136 at its lower end which engages step 130 of "D" shaped section 126. Retainer-lock 134 is urged against fold 132 by retaining member 138 which is in abutting engagement with the opposite surface of slot 128 and retainer-lock 134 whereby fold 132 is compressed against the surface of slot 128 and retained to forward frame member 120. It will be appreciated that a similar arrangement may be used to retain fabric mattress 12' to the rear retainer member.

Figures 2, 3:
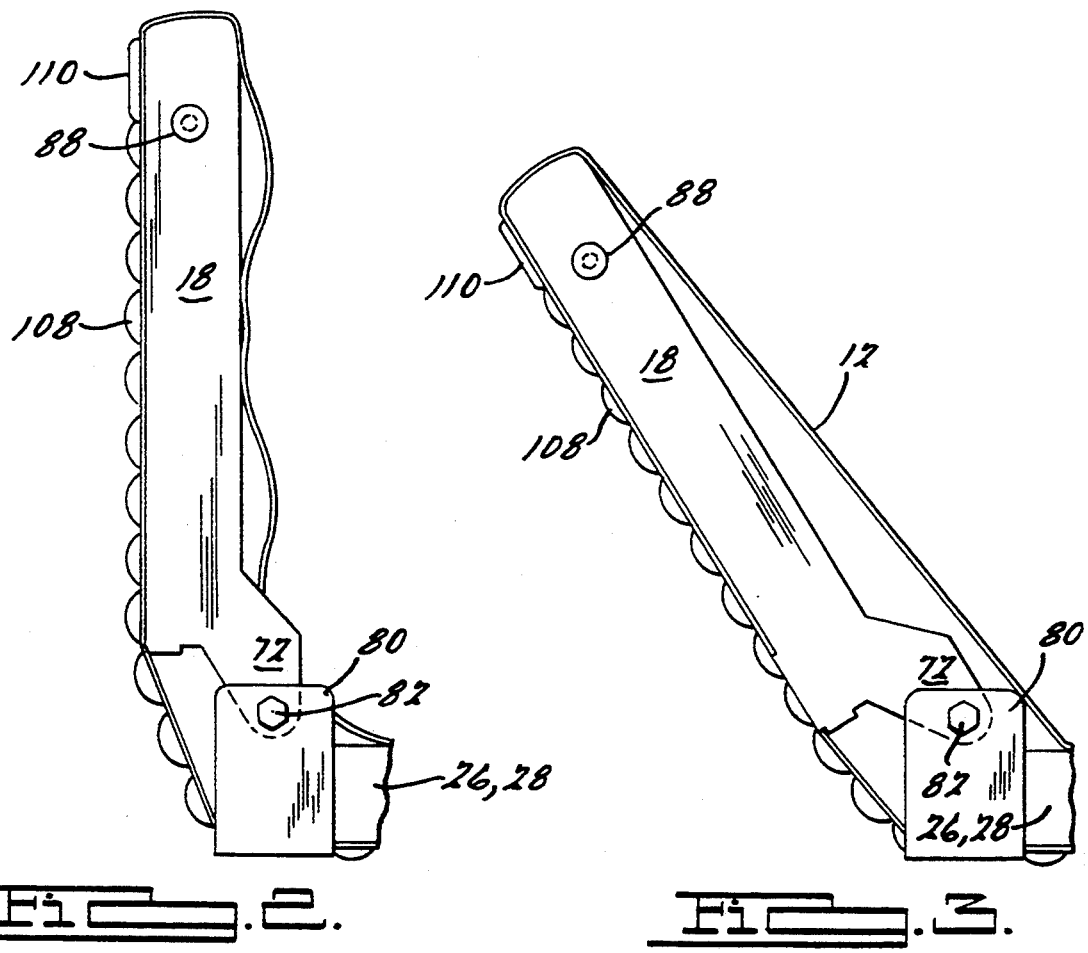
FIG. 2 is a side view of the folding bed of the present invention with the bed in a raised or stowed position.
FIG. 3 is a view similar to FIG. 2 with the bed in a partially lowered position, further illustrating the fabric mattress.

With reference to FIG. 2 folding bunk 10 is shown in an upright or stowed position. In this position, fabric mattress 12 is slack or loose hanging freely from forward frame member 64. Upon lowering folding bunk 10 from its stowed position to its sleeping position, slack in fabric mattress 12 is gradually taken up until folding bunk 10 reaches the position shown in FIG. 3 where folding bunk 10 is in a semi-open position and fabric mattress 12 is just taut. Further lowering of folding bunk 10 causes elastic stretching of fabric mattress 12 until folding bunk 10 is in its fully lowered or horizontal position. As discussed hereinbefore, folding frame member 18 is pivotably mounted to frame member 16 such that in its fully lowered or horizontal position there is an over-center condition. Thus it will be appreciated, tension of fabric mattress 12 acts to retain folding bunk 10 in its lowered position with striker 88 bearing against latch 90. Pre-load tension in fabric mattress 12 provides a firm sleeping surface, yet since fabric mattress 12 is capable of further stretching, the sleeping surface is not hard or uncomfortable. In the preferred embodiment, fabric mattress 12 is made of Dymetrol material and is caused to stretch approximately about 5 percent from the unstretched condition.

It is advantageous to have fabric mattress 12 under a small amount of tension as opposed to being loose when the folding bunk 10 is in the stowed position. The tension in the fabric mattress 12 assists in lifting the folding frame member 18 to the upright position, and further acts to retain the folding frame member 18 in the upright position without the use of latches, straps or gas cylinders.

Figure 8:
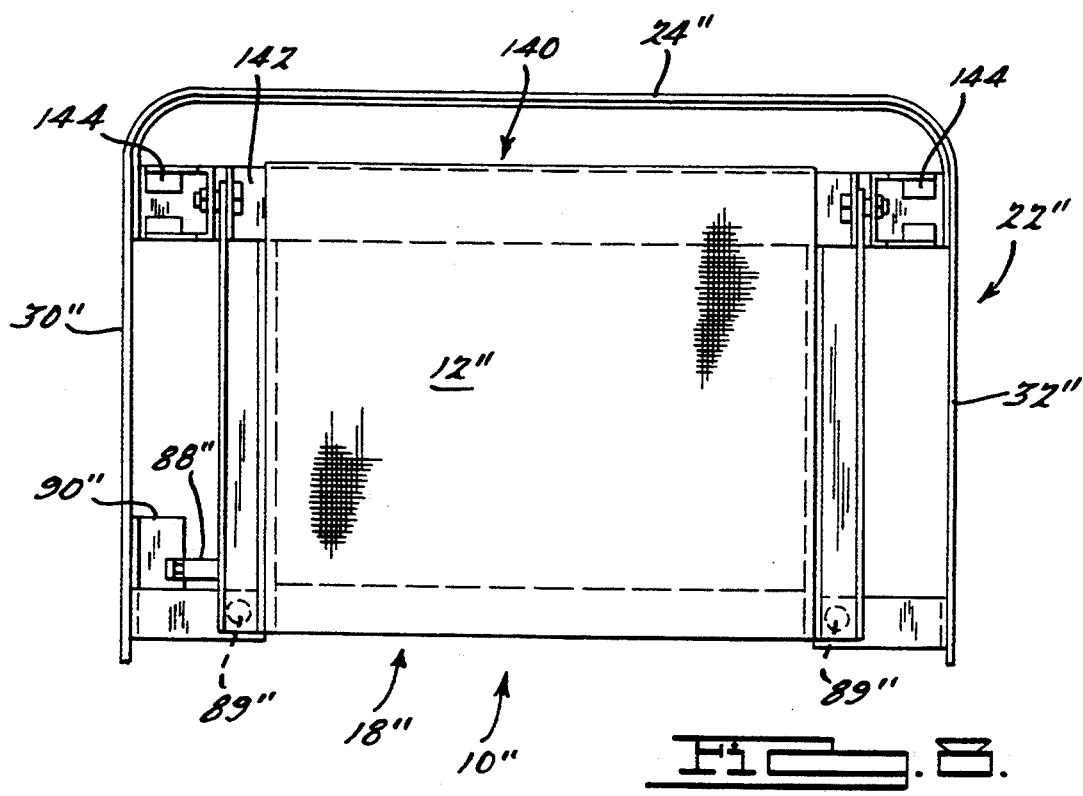
FIG. 8 is a view similar to FIG. 1 showing an additional embodiment of the folding bed.

With reference to FIG. 8 there is shown an additional embodiment of the present invention. The structure of the folding bed 10″ shown in FIG. 8 is for the most part the same as that discussed in the previous embodiments, and double primed reference numerals are used to denote those elements which are the same as in the first embodiment. In the embodiment shown in FIG. 8, there is a rear frame member 140 and a folding frame member 18″ pivotably mounted to rear frame member 140 in a manner previously described. Rear frame member has a transverse member 142 similar to retaining member 38 into which fabric mattress 12″ may be secured to also in a manner previously described. Transverse member 142 has secured at each end, hinge brackets 144 which provided for the pivoting attachment of folding frame member 18″ to rear frame member 140. Rear frame member is then suitably attached to side walls 30″ and 32″ of truck cab 22″ by fasteners or bonding. Folding bed 10″ functions in the same manner as described in the previous embodiments.

While it is apparent that the preferred embodiments of the invention disclosed are well calculated to provide the advantages and features above stated, it will be appreciated that the invention is susceptible to modification, variation, and change without departing from the proper scope or fair meaning of the subjoined claims.

We claim:

1. A combination folding bunk and cab of a vehicle comprising:
   a first frame member secured within said cab;
   a second frame member pivotably mounted to said first frame member such that said second frame member is positionable to an over-center position relative to said first frame member when said second frame member pivots from a first stowed position to a second extended position;
   a semi-elastic mattress;
   means for securing said mattress to said first and second frame members; and
   whereby pivoting said second frame member to said second extended position causes said semi-elastic mattress to be elastically extended so as to provide a firm substantially horizontal surface.

2. The folding bunk of claim 1 wherein said second frame member comprises:
   first and second side frame members and a forward frame member secured between said side frame members thereby forming a generally "C" shaped member, said side frame members pivotably mounted to said first frame member for extending said forward frame member with respect to said first frame member.

3. The folding bunk of claim 2 wherein said fabric mattress is secured between said first frame member and said forward frame member.

4. The folding bunk of claim 3 wherein said fabric mattress is elastically stretched in said extended position.

5. The folding bunk of claim 4 wherein said fabric mattress is stretched approximately about 5 percent in the extended position.

6. The folding bunk of claim 5 wherein said fabric mattress is constructed of Dymetrol material.

7. A combination folding bed and vehicle cab comprising:
   a bed frame including a fixed frame member secured within the vehicle cab and a movable frame member operatively associated with said fixed frame member such that said movable frame member is in an over-center condition relative to said fixed frame member when said movable frame member is positioned from a first stowed position to a second extended position;
   a semi-elastic mattress having a pair of edges, one edge affixed to said fixed frame member and the other edge affixed to said movable frame member; and
   whereby positioning said movable frame member from said first stowed position to said second extended position stretches said mattress for providing a tensioned sleeping surface.

8. The folding bed of claim 7 wherein said movable frame member comprises a pair of side members pivotably connected to said fixed frame member at a first end and a forward frame member disposed on said pair of side frame members opposite said fixed frame member.

9. The folding bed of claim 7 further comprising a stop bumper disposed within said cab to engage said moveable frame member when said bed frame is in said second position.

10. The folding bed of claim 7 further comprising a latch disposed within said cab and a striker extending from said movable frame member to engage said latch when said bed frame is in said second position.

11. The folding bed of claim 7 further comprising:
    a first channel formed in said fixed frame member and a second channel formed in said movable frame members;
    first and second folds formed in said fabric mattress, said first fold disposed within said first channel, and said second fold disposed within said second channel; and
    retaining means for engaging and compressing said first and second folds against a first surface of said channels, thereby retaining said folds within said channels.

12. The folding bed of claim 11 wherein said retaining means comprises:
    a retainer lock disposed within each of said channels for engaging said folds and said first surface; and
    a retaining member disposed within each of said channels for engaging said retainer-locks and a second surface within said channels.

13. A combination folding bed and vehicle interior comprising:
    a semi-elastic mattress having a pair of edges defining an unstretched mattress width;
    a first member secured within the vehicle interior, one of said edges being affixed to said first member;
    a second member, the other of said edges being affixed to said second member, said second member being positionable from a first position in which said mattress is stored to a second position in which said mattress is exposed to provide a tensioned sleeping surface;

said second member being disposed relative to said first member such that the distance between said first and second members is less than said unstretched width of said mattress when said second member is in said first position and the distance between said first and second members is greater than said unstretched width of said mattress when said second member is in said second position; and whereby positioning said second member from said first position to said second position stretches said mattress to a stretched width such that said stretched width is greater than said unstretched width, said mattress being capable of further stretching when exposed, and whereby positioning said second member from said second position to said first position returns said mattress to said unstretched width.

14. The folding bed of claim 13 wherein said second member is operable for pivotal movement from said first position to said second position about an axis disposed intermediate said first and second members when said second member is in said second position.

15. The folding bed of claim 14 wherein the tensioning of said mattress acts to maintain said second member in said second position.

16. The folding bed of claim 15 wherein said second member is in an over-center condition relative to said axis when positioned to said second position.

17. The folding bed of claim 13 further comprising a stop engaging said second member to locate said second member in said second position.

18. The folding bed of claim 17 wherein said stop comprises a bumper secured within the vehicle interior.

19. The folding bed of claim 17 wherein said stop comprises a latch disposed within the vehicle interior and a striker extending from said second member for engaging said latch when said second member is in said second extended position.

20. The folding bed of claim 14 further comprising:
a first channel formed in said first member and a second channel formed in said second member, said first and second channels for receiving said edges of said mattress;

retainer means disposed within said first and second channels for engaging said edges and securing said mattress to said bed frame.

* * * * *

UNITED STATES PATENT AND TRADEMARK OFFICE
CERTIFICATE OF CORRECTION

PATENT NO. : 5,432,963
DATED : July 18, 1995
INVENTOR(S) : Robert C. Coral and Edward L. Lehnert It is certified that error appears in the above-indentified patent and that said Letters Patent is hereby corrected as shown below:

Column 1, line 5, "08/003.149" should be -- 08/003,149 --.

Column 5, line 40, after "and" insert -- vehicle --.

Column 5, line 40, delete "of a vehicle".

Column 5, line 49, after "mattress;" insert -- and --.

Column 5, line 51, delete "and".

Column 5, line 57, "folding bunk" should be -- combination --.

Column 5, line 66, "folding bunk" should be -- combination --.

Column 6, line 4, "folding bunk" should be -- combination --.

Column 6, line 7, "folding bunk" should be -- combination --.

Column 6, line 14, after "is" insert -- disposed --.

Column 6, line 17, "positioned" should be -- moved --.

UNITED STATES PATENT AND TRADEMARK OFFICE
CERTIFICATE OF CORRECTION

PATENT NO. : 5,432,963
DATED : July 18, 1995
INVENTOR(S) : Robert C. Coral and Edward L. Lehnert It is certified that error appears in the above-indentified patent and that said Letters Patent is hereby corrected as shown below:

Column 6, line 18, after "position;" insert -- and --.

Column 6, line 22, delete "and".

Column 6, line 27, "folding bed" should be -- combination --.

Column 6, line 32, "folding bed" should be -- combination --.

Column 6, line 36, "folding bed" should be -- combination --.

Column 6, line 40, "folding bed" should be -- combination --.

Column 6, line 43, "members" should be -- member --.

Column 6, line 45, after "fold" insert -- being --.

Column 6, line 46, after "fold" insert -- being --.

Column 6, line 52, "folding bed" should be -- combination --.

Column 6, line 55, "folds" should be -- fold --.

Column 6, line 55, after "surface" insert -- therein --.

UNITED STATES PATENT AND TRADEMARK OFFICE
CERTIFICATE OF CORRECTION

PATENT NO. : 5,432,963
DATED : July 18, 1995
INVENTOR(S) : Robert C. Coral and Edward L. Lehnert It is certified that error appears in the above-indentified patent and that said Letters Patent is hereby corrected as shown below:

Column 6, line 57, "retainer-locks" should be -- retainer-lock --.

Column 6, line 58, "channels" should be -- channel --.

Column 6, line 64, after ";" insert -- and --.

Column 7, line 10, delete "and".

Column 7, line 21, "folding bed" should be -- combination --.

Column 8, line 1, "folding bed" should be -- combination --.

Column 8, line 4, "folding bed" should be -- combination --.

Column 8, line 7, "folding bed" should be -- combination --.

Column 8, line 10, "folding bed" should be -- combination --.

Column 8, line 12, "folding bed" should be -- combination --.

Column 8, line 17, "folding bed" should be -- combination --.

UNITED STATES PATENT AND TRADEMARK OFFICE
CERTIFICATE OF CORRECTION

PATENT NO. : 5,432,963
DATED : July 18, 1995
INVENTOR(S) : Robert C. Coral and Edward L. Lehnert It is certified that error appears in the above-indentified patent and that said Letters Patent is hereby corrected as shown below:

Column 8, line 20, delete "for".

Column 8, line 24, "bed frame" should be -- first and second members --.

Signed and Sealed this

Twenty-second Day of October, 1996

Attest:

BRUCE LEHMAN

Attesting Officer        Commissioner of Patents and Trademarks